United States Patent
Nez

(10) Patent No.: US 6,698,601 B1
(45) Date of Patent: Mar. 2, 2004

(54) GREASE GUN HOLDER

(76) Inventor: Jerry Nez, 4032 N. 40th Pl., Phoenix, AZ (US) 85018

( * ) Notice: Subject to any disclaimer, the term of this patent is extended or adjusted under 35 U.S.C. 154(b) by 0 days.

(21) Appl. No.: 10/200,799

(22) Filed: Jul. 23, 2002

(51) Int. Cl.[7] .................................................. A47F 7/00
(52) U.S. Cl. .................... 211/70.6; 248/309.1; 224/904
(58) Field of Search ............................. 211/70.6, 87.01, 211/88.01, 70.8; 248/309.1; 224/904

(56) References Cited

U.S. PATENT DOCUMENTS

| | | | | |
|---|---|---|---|---|
| 1,647,039 A | * | 10/1927 | Fischer | |
| 3,445,046 A | * | 5/1969 | Wilson | |
| 4,093,170 A | * | 6/1978 | Spray | |
| 4,254,926 A | | 3/1981 | Reeberg | |
| 4,830,247 A | | 5/1989 | Banks | |
| 5,080,240 A | | 1/1992 | Williams | |
| 5,232,137 A | * | 8/1993 | Devine | |
| 5,302,302 A | * | 4/1994 | Shelley et al. | |
| 5,871,106 A | * | 2/1999 | Oksa et al. | 211/70.6 |
| 6,102,215 A | | 8/2000 | Guida | |
| 6,126,129 A | * | 10/2000 | Herron | 248/309.1 X |
| 6,325,261 B1 | * | 12/2001 | Webber | 224/904 X |
| 6,530,170 B1 | * | 3/2003 | Sweeney | 211/70.8 X |

* cited by examiner

*Primary Examiner*—Robert W. Gibson, Jr.
(74) *Attorney, Agent, or Firm*—Sturm & Fix LLP

(57) ABSTRACT

A grease gun holder including an elongated tube having a longitudinal slot extending down from the top end toward the bottom end. The tube is sized to receive the cylinder of a grease gun and the slot is sized to receive the bracket that offsets the operating lever from the cylinder. Thus, when the cylinder is placed in the tube, the operating lever is positioned outside the tube where it is readily accessible to the user and can be grasped to remove the grease gun from the holder. The grease gun holder also includes threadably attached top and bottom caps, and circumferential grooves in the exterior wall of the tube to receive split ring elements of wall hanging brackets.

5 Claims, 1 Drawing Sheet

GREASE GUN HOLDER

BACKGROUND OF THE INVENTION

1. Field of the Invention

The present invention relates to the field of holders for dispensing guns, and more particularly to a grease gun holder.

2. Description of Related Art

As can be seen by reference to the following U.S. Pat. Nos. 4,254,926; 4,830,247; 5,080,240; and 6,102,215 the prior art is replete with myriad and diverse holders for dispensing guns.

While all of the aforementioned prior art constructions are more than adequate for the basic purpose and function for which they have been specifically designed, they are uniformly deficient with respect to their failure to provide a simple, efficient, and practical grease gun holder.

As a consequence of the foregoing situation, there has existed a longstanding need for a new and improved grease gun holder, and the provision of such a device is a stated objective of the present invention.

BRIEF SUMMARY OF THE INVENTION

Briefly stated, the present invention provides a grease gun holder including an elongated tube having a longitudinal slot extending down from the top end toward the bottom end. The tube is sized to receive the cylinder of a grease gun and the slot is sized to receive the bracket that offsets the operating lever from the cylinder. Thus, when the cylinder is placed in the tube, the operating lever is positioned outside the tube where it is readily accessible to the user and can be grasped to remove the grease gun from the holder. The grease gun holder also includes threadably attached top and bottom caps, and circumferential grooves in the exterior wall of the tube to receive split ring elements of wall hanging brackets.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figures 1, 2:
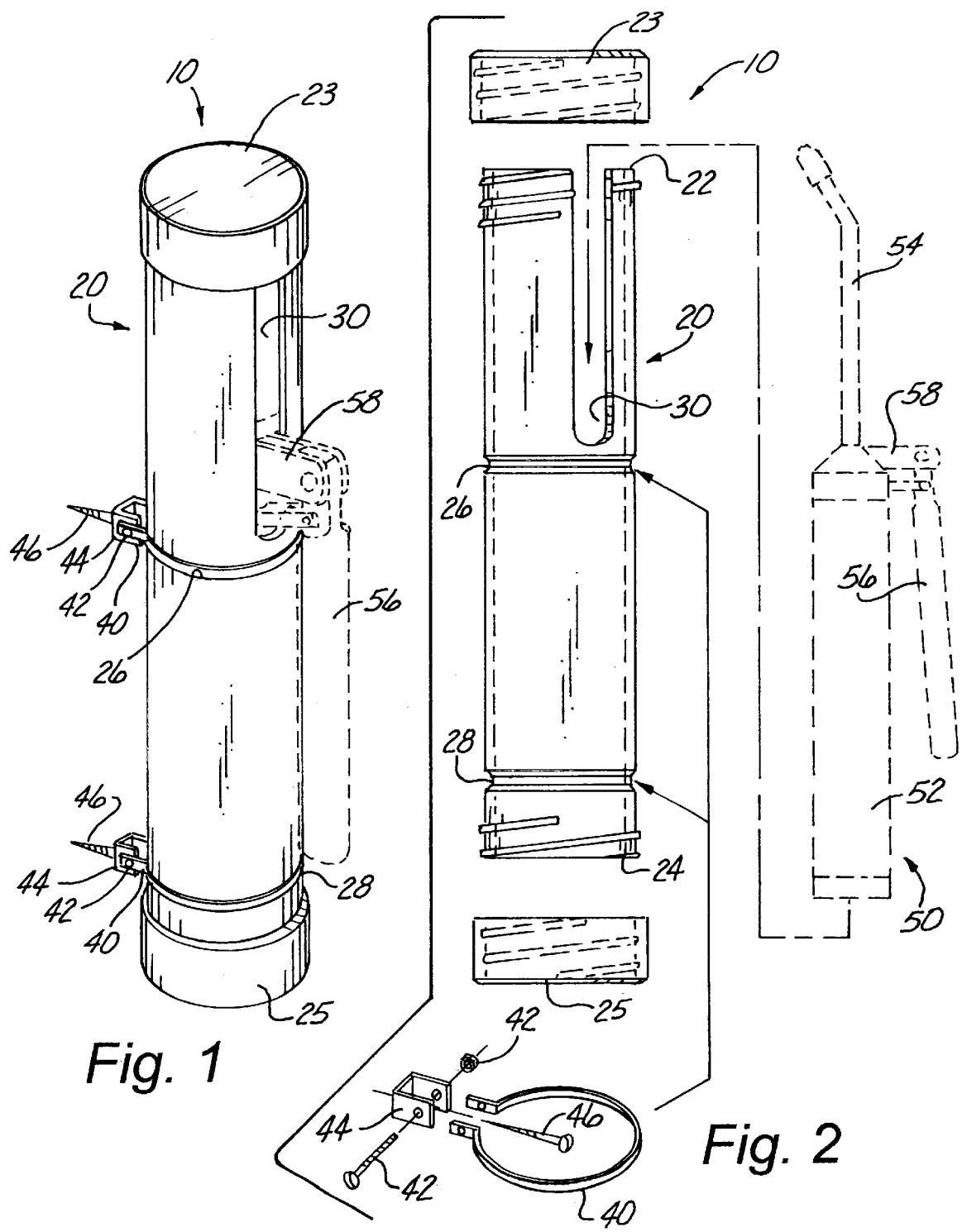
FIG. 1 is a perspective view of the grease gun holder of the present invention showing the grease gun handle positioned outside of the holder tube.
FIG. 2 is an exploded perspective view illustrating how the grease gun is positioned in the holder, and showing how the wall mounting brackets are attached to the tube.

As can be seen by reference to the drawings, the grease gun holder that forms the basis of the present invention is designated generally by the reference number 10. The grease gun holder 10 includes an elongated tube 20 having a top open end 22, a bottom open end 24, and longitudinal slot 30 extending down from the top end 22. The exterior of the tube 20 carries threads at the top and bottom ends 22 and 24 that selectively engage threaded top and bottom caps 23 and 25. The exterior of the tube also carries a pair of longitudinally spaced circumferential grooves 26 and 28 that matingly receive a split ring 40. The ring 40 is in turn secured by a fastener 42 to a bracket 44 secured to a wall, vehicle, or piece of equipment by a second fastener 46.

FIG. 2 shows a typical grease gun 50, including a cylinder 52, a dispensing nozzle 54, and an operating lever 56 pivotally attached to and spaced out from the cylinder 52 by lever bracket 58. The tube 20 is sized to receive the cylinder 52 and the tube slot 30 is sized to receive the lever bracket 58. When the grease gun 50 is positioned in the tube 20, the operating lever 56 is positioned outside the tube 20 where it is readily accessible to the user.

The holder 10 may be mounted at any convenient location on a shop wall, vehicle, or piece of equipment. The grease gun 50 can be kept out of the heat in a place it can be easily located when needed. The user does not have to worry about tools getting greasy or trying to find the grease gun 50.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A holder for a grease gun having an elongated cylinder and an operating lever pivotally attached to and spaced out from the cylinder by a lever bracket that extends out from an outer wall of the cylinder; the holder comprising:

an elongated tube sized to receive the cylinder, the tube having a top open end and a longitudinal slot extending from the top end downwardly toward the bottom end, the slot being disposed to receive the lever bracket when the cylinder is disposed outside the tube; and a top cap disposed to selectively close the top open end of the tube, wherein the top cap is threadably attached to the top open end of the tube.

2. The holder of claim 1 wherein the tube includes a bottom end.

3. The holder of claim 2 further including a bottom cap disposed to selectively close the bottom open end of the tube.

4. The holder of claim 3 wherein the bottom cap is threadably attached to the bottom open end of the tube.

5. The holder of claim 1 wherein the tube includes a pair of longitudinally spaced circumferential grooves formed in an outer wall of the tube, and wherein the holder further includes a pair of mounting brackets each having a split ring disposed to matingly engage one of the pair of grooves in the tube, whereby the holder may be mounted on a wall, vehicle, or piece of equipment.

* * * * *